Jan. 1, 1952     G. O. BIRDWELL     2,580,508
BEARING ASSEMBLY
Filed Oct. 4, 1949     2 SHEETS—SHEET 1
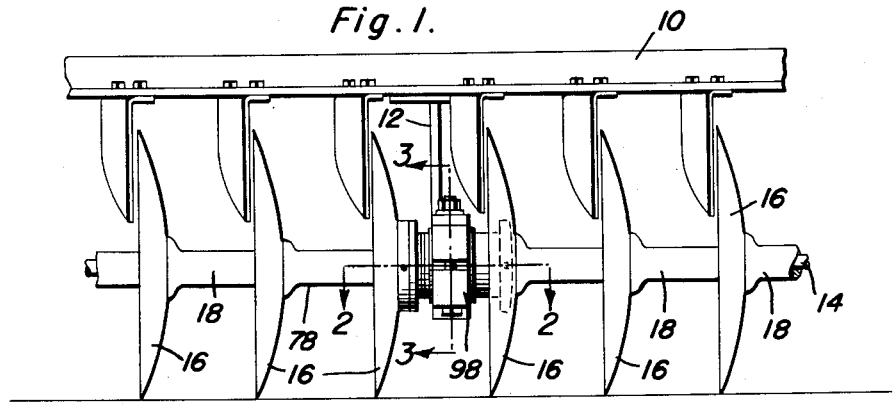
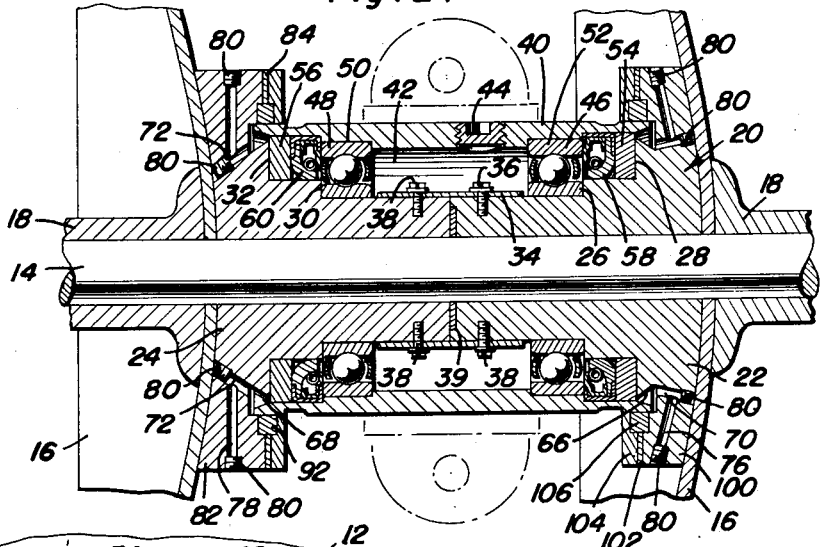
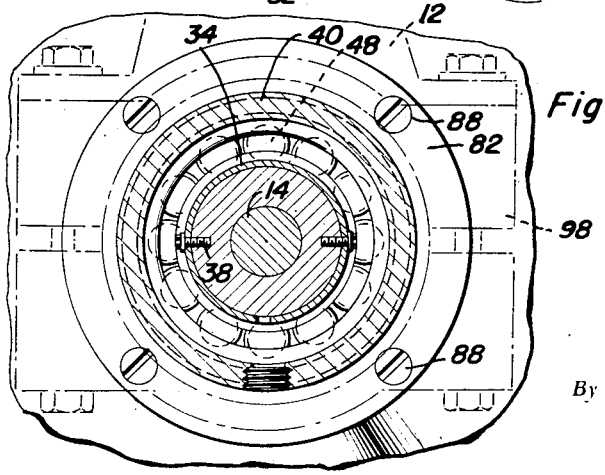
Inventor
Gus O. Birdwell Jan. 1, 1952 G. O. BIRDWELL 2,580,508
BEARING ASSEMBLY
Filed Oct. 4, 1949 2 SHEETS—SHEET 2
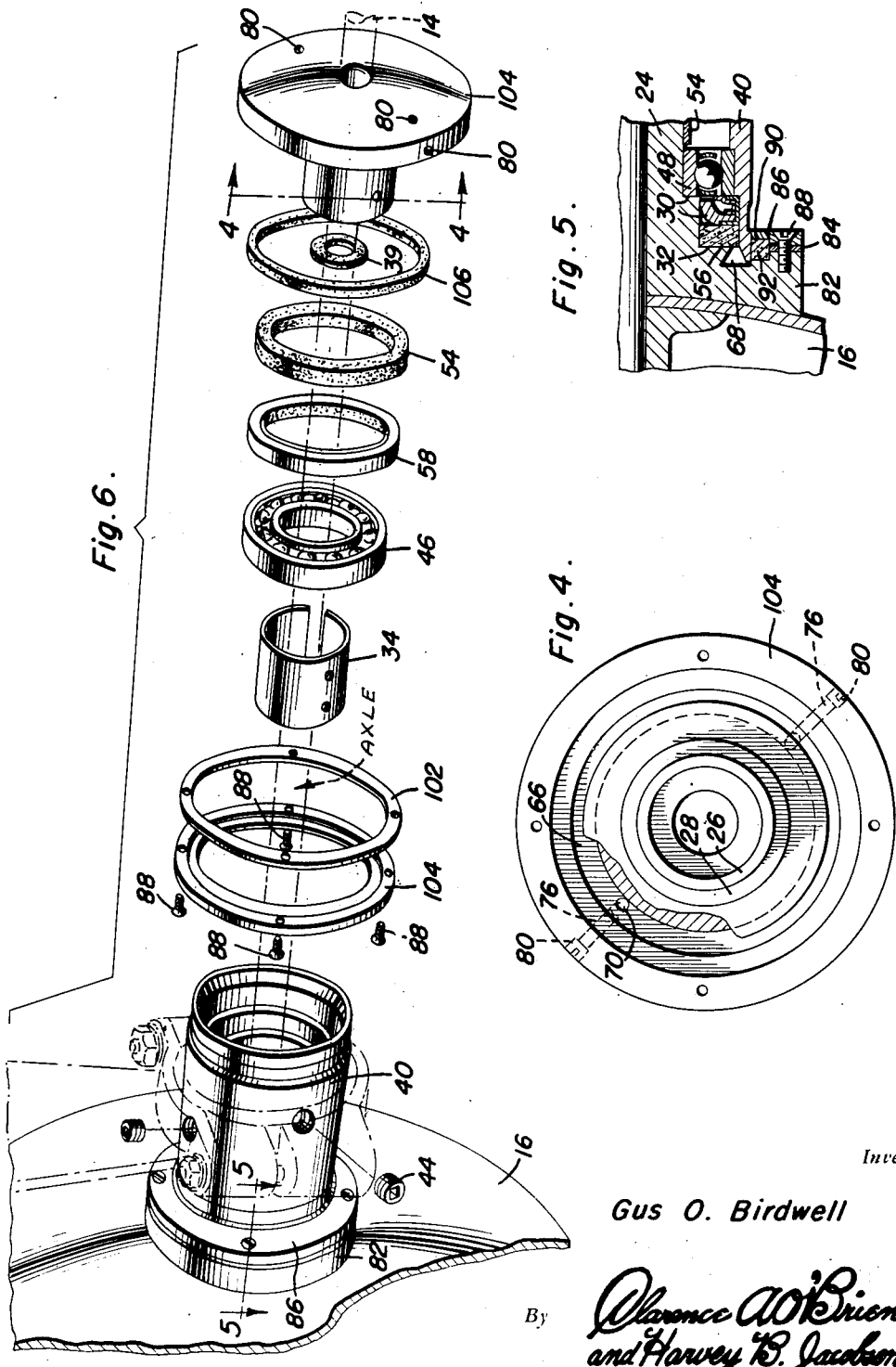
Inventor
Gus O. Birdwell Patented Jan. 1, 1952

2,580,508

UNITED STATES PATENT OFFICE 2,580,508

BEARING ASSEMBLY

Gus O. Birdwell, Perryton, Tex.

Application October 4, 1949, Serial No. 119,445

5 Claims. (Cl. 308—181)

This invention relates to novel and useful improvements in bearing assemblies adapted particularly for use in connection with farm implements.

An object of this invention is to provide an improved bearing assembly having the characteristic of durability in that there is provision made for preventing a great amount of the impurities such as dust, farm material and the like from entering the chamber having lubricant therein together with antifriction bearings, preferably of the roller or ball type, thereby lessening the wear in the anti-friction bearings.

Another object of this invention is to improve the bearing construction used in connection with farm implements of the type having earth working tools thereby necessitating the bearings to be close to the ground, by the provision of air receiving passages, the passages being in juxtaposition with respect to oil seals so that compressed air may be introduced into the passages blowing the foreign matter and impurities from the said passages when it accumulates therein, the accumulation being substantially unavoidable due to the nature of the work performed by the farm implement.

Another object of this invention is to materially lessen the maintenance of a farm implement or the like through the use of an improved bearing which consists of a spool made of two portions or sections fixedly connected together which spool accommodates a structural arrangement providing a chamber, a pair of antifriction bearings communicating with and disposed in the chamber so that constant lubrication may be effected together with a plurality of preferably high grade oil seals adjacent the antifriction bearings and air passages along side of the oil seals so that the impurities collected therein may be blown from the passages by forcing compressed air through the passages.

Ancillary objects and features of novelty will become apparent to those skilled in the art, following the description of the preferred form of the invention, illustrated in the accompanying drawings, wherein:

Figure 1 is an elevational fragmentary view of an implement having the bearing assembly attached thereto;

Figure 2 is a sectional view taken on the line 2—2 of Figure 1 and in the direction of the arrows;

Figure 3 is a sectional view taken on the line 3—3 of Figure 1 and in the direction of the arrows;

Figure 4 is a view taken on the line 4—4 of Figure 6 with portions being broken away;

Figure 5 is a fragmentary view on an enlarged scale and taken substantially on the line 5—5 of Figure 6 and in the direction of the arrows;

Figure 6 is an exploded perspective view of the bearings assembly.

The illustrated part of a farm implement includes a frame 10 having one hanger 12 depending therefrom together with a shaft or axle 14 having earth working tools 16 carried thereby and spaced by means of the sleeves 18.

The bearing assembly between the tools 16 consists of a spool generally indicated at 20 which consists of a pair of sections 22 and 24 respectively. With respect to the section 22 it is noted that it has a smoothly curved end in order to accommodate one of the earth working tools 16. Both sections have shoulders at the ends thereof. Section 22 has the shoulder 26 and the shoulder 28, while the section 24 has the shoulders 30 and 32 respectively. The center part of the spool 20 is narrower than the ends of the spool and there is a coupling sleeve 34 with bolts 36 therein connected with both sections 22 and 24. A gasket 39 is disposed in a recess between the ends of each section.

A bearing sleeve 40 is disposed in concentric relationship with the center of the spool but spaced therefrom to form a lubricant recess 42. A removable plug 44 is provided in the sleeve 40 and is used for the purpose of putting lubricant in the chamber 42.

An antifriction bearing 46 of conventional description and a similar antifriction bearing 48 will be noted in Figure 2. These antifriction bearings are disposed on the reduced center parts of the sections 22 and 24 and the bearing 48 abuts the shoulder 30, while the bearing 46 abuts the shoulder 26. Recesses 50 and 52 formed in the sleeve 40 also form seats for the bearings 46 and 48.

Abutting the shoulders 28 and 32 is a pair of oil seals. Each assembly consists of felt rings 54 and 56 respectively together with a high grade oil seal 58 and 60. The oil seals 58 and 60 contact the antifriction bearings 46 and 48, while the felt or similar material seals 54 and 56 contact the seals 58 and 60 and the shoulders 28 and 32.

While the antifriction bearings 46 and 48 are disposed on the reduced center part of the spool, the oil seals are disposed on the spool but on a raised portion thereof.

An annular passage or channel 66 and an identical channel or passage 68 is provided in the end parts of the spool 20 to form dust traps. A number of air inlet openings 70 are provided in communication with the passage 66, while a number of air inlet openings 72 are communicated with the passage 68. Air outlet openings 76 communicate with the inlet passages or openings 70, and similar air outlet openings 78 communicate with the openings 72. Closures in the form of screws 80 are used for all of the inlet and outlet passages. It is clear that the removal of some of the closures permits a compressed air bore to be placed into one of the inlets so that the compressed air may be urged through the passages to blow impurities which have been collected, from the passages. The largest amount of such impurities are collected in the passages as they cannot pass the felt, or other similar material, rings 54 and 56.

By referring to Figure 5, the flange 82 of the section 24 is more readily obvious. This flange has one surface smoothly curved to accommodate the earth working tool 16. It is an integral part of the spool section 24. Disposed on the surface opposite the smoothly curved surface, is a gasket 84, and a washer 86 is disposed on the said gasket 84. The washer is held in place by any suitable means as the screws 88. The recess 90 is formed in the washer to accommodate the seal or packing 92. This packing engages the outside surface of the end of the sleeve 40.

The sleeve 40 has its outside surface used for the purpose of accommodating the split bearing (Figure 1) 98 which is disposed at the end of the hanger 12.

When square shafts are used in lieu of the shaft 14 or when any other type of shaft is used, it is necessary only to form the bore of the spool of a complemental shape.

The flange 100 of the section 22 has operatively associated therewith, the gasket 102 and washer 104 similar to the previously described similar structure on the other side of the bearing assembly. The packing 106 is identical to the packing 92.

The operation of the invention has been described in conjunction with the structure. The practical use involves the disposition of the device on the farm implement but it may be used in connection with other types of machinery.

Lubricant is simply introduced into the chamber 42 through the filler plug 44 opening, constantly lubricating the antifriction bearings. The lubricant is maintained in this chamber by means of the oil seal assemblies together with the felt rings 54 and 56.

In connection with farm operations it is practically impossible to prevent dust from entering a sealed chamber, which is capable of movement. Accordingly, the use of the felt retainers 54 and 56 together with the air passages for removal of impurities and foreign matter materially lessens the possibility of foreign material entering into the region of the antifriction bearings 48 and 49 respectively.

Having described the invention, what is claimed as new is:

1. A bearing assembly for a farm implement which includes a frame having a hanger fixed thereto and a plurality of earth working tools secured to a shaft, said assembly comprising a spool having the shaft passed therethrough, anti-friction bearings disposed on said spool, a sleeve disposed on said anti-friction bearings, which bearings space the center part of said sleeve from the center part of said spool to form a lubricant chamber, the hanger being fixed to the outside surface of said sleeve, oil seals disposed adjacent but spaced from the ends of said spools to prevent foreign matter from entering the lubricant chamber, dust trap passages at the ends of said spool and at opposite sides of the seals, a compressed air inlet opening communicated with each passage to force dust from the passages, the ends of said sleeve being disposed in said passages and overlying said oil seals, and shoulders formed in said sleeve constituting abutments for said oil seals.

2. A bearing assembly for a farm implement which includes a frame having a hanger fixed thereto and a plurality of earth working tools secured to a shaft, said assembly comprising a spool having the shaft passed therethrough, anti-friction bearings disposed on said spool, a sleeve disposed on said anti-friction bearings, which bearings space the center part of said sleeve from the center part of said spool to form a lubricant chamber, the hanger being fixed to the outside surface of said sleeve, oil seals disposed adjacent but spaced from the ends of said spools to prevent foreign matter from entering the lubricant chamber, dust trap passages at the ends of said spool and at the outer sides of the seals, a compressed air inlet opening communicated with each passage to force dust from the passages, closures for said openings, and air escape openings connected with said passages and having closures therefor.

3. A bearing assembly for a farm implement which includes a frame having a hanger fixed thereto and a plurality of earth working tools secured to a shaft, said assembly comprising a spool having the shaft passed therethrough, anti-friction bearings disposed on said spool, a sleeve disposed on said anti-friction bearings, which bearings space the center part of said sleeve from the center part of said spool to form a lubricant chamber, the hanger being fixed to the outside surface of said sleeve, oil seals disposed adjacent but spaced from the ends of said spool and in confronting relation with said bearings to prevent foreign matter from entering the lubricant chamber, dust trap passages at the ends of said spool and at the outer sides of the seals, a compressed air inlet opening communicated with each passage to force dust from the passages, closures for said openings, air escape openings connected with said passages and having closures therefor, said spool being made of two sections, means fastening said sections together, and the opposite ends of said sections being smoothly curved to accommodate the earth working tools.

4. A bearing assembly comprising a spool having a first and a second shoulder at each end, anti-friction bearings abutting the first shoulders, lubricant seals abutting the second shoulders, inwardly opening channels in the ends of said spool, a sleeve disposed on said anti-friction bearings and spaced from the center part of the spool forming a lubricant chamber, the ends of said sleeve being disposed in said channels and overlying said lubricant seals, and said channels constituting dust receiving passages in said spool on one side of each of said seals.

5. A bearing assembly comprising a spool having a first and a second shoulder at each end, anti-friction bearings abutting the first shoulders, lubricant seals abutting the second shoulders and confronting said anti-friction bearings, a sleeve disposed on said anti-friction bearings and spaced from the center port of the spool forming a lubricant chamber, dust receiving passages in said spool on one side of each of said seals, the ends of said spool having openings with closures, and said openings being communicated with said passages to introduce compressed air in said passages for blowing the dust therefrom.

GUS O. BIRDWELL.

REFERENCES CITED

The following references are of record in the file of this patent:

UNITED STATES PATENTS

| Number | Name | Date |
|---|---|---|
| 1,957,054 | Waldorf | May 1, 1934 |
| 2,314,469 | Walker | Mar. 23, 1943 |